United States Patent
Davis et al.

(10) Patent No.: US 9,287,065 B1
(45) Date of Patent: Mar. 15, 2016

(54) COOLING ELECTRICAL EQUIPMENT

(71) Applicant: Google Inc., Mountain View, CA (US)

(72) Inventors: Ryan T. Davis, Mountain View, CA (US); James C. Schmalzried, San Jose, CA (US); Jyoti Sastry, San Jose, CA (US); Ankit Somani, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 77 days.

(21) Appl. No.: 14/301,739

(22) Filed: Jun. 11, 2014

(51) Int. Cl.
*H05K 7/20* (2006.01)
*H01H 9/52* (2006.01)
*H02B 1/56* (2006.01)

(52) U.S. Cl.
CPC .............. *H01H 9/52* (2013.01); *H05K 7/20209* (2013.01); *H02B 1/56* (2013.01); *H02B 1/565* (2013.01)

(58) Field of Classification Search
CPC ...... H02B 1/56; H02B 1/565; H05K 7/20745; H05K 7/20581; H05K 1/0207
See application file for complete search history.

(56) References Cited

U.S. PATENT DOCUMENTS

| | | | | |
|---|---|---|---|---|
| 5,172,300 | A * | 12/1992 | Morby | H02B 1/056 361/609 |
| 5,315,477 | A * | 5/1994 | Schumacher | H02B 1/56 200/289 |
| 5,831,509 | A | 11/1998 | Elms et al. | |
| 5,875,087 | A | 2/1999 | Spencer et al. | |
| 6,141,197 | A | 10/2000 | Kim et al. | |
| 6,556,404 | B2 * | 4/2003 | Figueroa | H02B 1/56 361/103 |
| 6,822,861 | B2 | 11/2004 | Meir | |
| 6,856,503 | B2 * | 2/2005 | Apfelbacher | H01H 50/021 165/121 |
| 7,253,379 | B2 | 8/2007 | Lakner et al. | |
| 7,881,033 | B2 | 2/2011 | Chartouni et al. | |
| 8,169,775 | B2 | 5/2012 | Bortoli et al. | |
| 8,665,047 | B1 | 3/2014 | Dively et al. | |
| 8,755,187 | B2 * | 6/2014 | Zhang | H02B 1/056 174/59 |
| 2002/0171986 | A1 * | 11/2002 | Figueroa | H02B 1/56 361/93.1 |
| 2003/0035264 | A1 * | 2/2003 | Hartel | H05K 7/20572 361/678 |
| 2007/0081302 | A1 * | 4/2007 | Nicolai | H05K 7/20754 361/678 |
| 2008/0212265 | A1 * | 9/2008 | Mazura | H05K 7/20754 361/678 |
| 2010/0226073 | A1 * | 9/2010 | Nicolai | F24F 5/00 361/678 |
| 2010/0302715 | A1 * | 12/2010 | Bortoli | H01H 9/52 361/676 |
| 2014/0160636 | A1 * | 6/2014 | Rajvanshi | H02B 1/565 361/608 |
| 2014/0313643 | A1 * | 10/2014 | Westrick, Jr. | H05B 37/02 361/641 |

FOREIGN PATENT DOCUMENTS

EP 2528092 A1 11/2012

* cited by examiner

*Primary Examiner* — Gregory Thompson
(74) *Attorney, Agent, or Firm* — Fish & Richardson P.C.

(57) ABSTRACT

A circuit breaker system includes a circuit breaker that includes an electrical input for a power circuit and positioned on a first holder in a housing of the circuit breaker system; a cooling device positioned on a second holder adjacent to the first holder in the housing, the cooling device configured to dissipate heat generated by the circuit breaker; and a control system coupled to the circuit breaker and the cooling device, the control system configured to determine a temperature condition of the circuit breaker and control the cooling device based at least in part on the determined temperature condition.

25 Claims, 7 Drawing Sheets

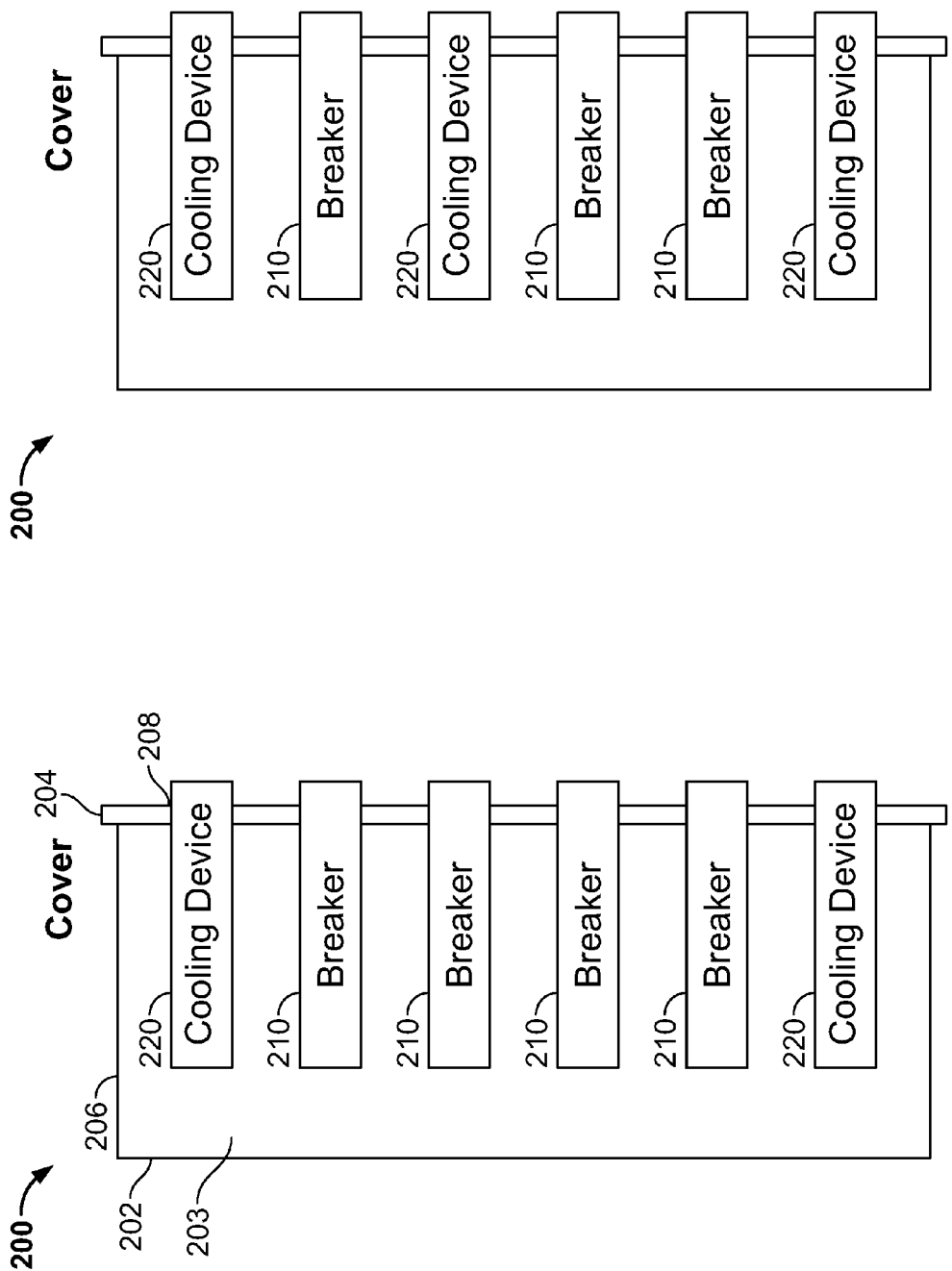

COOLING ELECTRICAL EQUIPMENT

TECHNICAL FIELD

This disclosure relates to cooling technology and, more particularly, to cooling electrical equipment such as circuit breakers.

BACKGROUND

Electrical equipment, e.g., circuit breakers, may generate excessive heat during use. For example, solid state circuit breakers can end up generating 5 to 10 W continuous heat per breaker. The excessive heat can negatively influence operation of the electrical equipment and potentially damage the electrical equipment, thus the excessive heat should be removed. In some examples, safety regulations, e.g., UL (Underwriters Laboratories) regulations, require no ventilation through a cover or enclosure in a circuit panel including circuit breakers, e.g., residential circuit breakers. Removing heat from the enclosed circuit breakers can be a challenge.

SUMMARY

In a general implementation, an electrical apparatus includes a housing including a base that includes a plurality of holding assemblies and an inner volume defined by sides and a cover; a plurality of circuit breakers, at least one circuit breaker configured to be coupled to a power circuit and positioned on a respective holding assembly of the base; and a cooling device positioned on a particular holding assembly of the base, the particular holding assembly adjacent to the circuit breakers, the cooling device configured to dissipate heat generated by the circuit breakers.

In a first aspect combinable with the general implementation, at least one circuit breaker of the circuit breakers includes a low-voltage circuit breaker that has a voltage rating between 0 and 1000 VAC or between 0 and 1500 VDC.

In a second aspect combinable with any of the previous aspects, at least one circuit breaker of the circuit breakers includes a solid state circuit breaker.

In a third aspect combinable with any of the previous aspects, a size of the cooling device is substantially the same as a size of at least one circuit breaker.

In a fourth aspect combinable with any of the previous aspects, the cover includes a plurality of slots, each slot corresponding to a respective holding assembly of the base, the slot sized for a circuit breaker positioned on the respective holding assembly to protrude through the slot.

In a fifth aspect combinable with any of the previous aspects, a particular slot of the plurality of slots for the particular holding assembly is open, and the cooling device is positioned to circulate ambient air into the inner volume through the particular slot.

In a sixth aspect combinable with any of the previous aspects, the cooling device includes one or more fans positioned to circulate ambient air into the inner volume and across the circuit breakers.

In a seventh aspect combinable with any of the previous aspects, the cooling device includes one or more fans positioned to circulate air from a bottom of the circuit breakers to a top of the circuit breakers across the circuit breakers.

An eighth aspect combinable with any of the previous aspects further includes a second cooling device, wherein the cooling device is positioned adjacent to a bottom of the circuit breakers, and the second cooling device is positioned adjacent to a top of the circuit breakers, the cooling device and the second cooling device configured to circulate air from the bottom to the top across the circuit breakers.

In a ninth aspect combinable with any of the previous aspects, at least one circuit breaker of the circuit breakers includes an enclosure fluidly coupled to an air flow passage that extends from at or near a bottom of the housing to at or near a top of the housing.

In a tenth aspect combinable with any of the previous aspects, at least one circuit breaker is conductively coupled to the respective holding assembly that is conductively coupled to a power distribution line.

In another general implementation, a method for cooling an electrical apparatus includes monitoring temperature conditions of a plurality of circuit breakers in the electrical apparatus, each circuit breaker electrically coupled to a power circuit and coupled to a holding assembly of a plurality of holding assemblies in a housing of the electrical apparatus; determining that a temperature condition of a particular circuit breaker of the plurality of circuit breakers is beyond a predetermined threshold; and cooling, based on the determined temperature condition, at least one of the plurality of circuit breakers with a cooling device positioned on a particular holding assembly of the plurality of holding assemblies.

A first aspect combinable with the general implementation further includes, for each circuit breaker, measuring a current that flows through the circuit breaker with a current sensor for the circuit breaker; and calculating, based on the measured current of the circuit breaker, at least one of an instant temperature of the circuit breaker or a predicted temperature for the circuit breaker.

A second aspect combinable with any of the previous aspects further includes measuring a temperature of the circuit breaker with a temperature sensor for the circuit breaker, and calculating, based on the measured current and the measured temperature, at least one of the instant temperature or the predicted temperature for the circuit breaker.

A third aspect combinable with any of the previous aspects further includes determining whether at least one of the instant temperature or the predicted temperature for the circuit breaker exceeds the predetermined threshold.

In a fourth aspect combinable with any of the previous aspects, cooling the particular circuit breaker with a cooling device includes at least one of turning on the cooling device or increasing power of the cooling device.

In a fifth aspect combinable with any of the previous aspects, cooling the at least one circuit breaker with a cooling device includes circulating ambient air into the housing and across the at least one circuit breaker.

In a sixth aspect combinable with any of the previous aspects, circulating ambient air into the housing includes circulating the ambient air into the housing through a slot in the housing, the slot aligned with the particular holding assembly.

In a seventh aspect combinable with any of the previous aspects, cooling the particular circuit breaker with a cooling device includes circulating, with the cooling device, air from a bottom of the circuit breakers to a top of the circuit breakers.

In an eighth aspect combinable with any of the previous aspects, cooling the particular circuit breaker with a cooling device includes circulating air through an enclosure of the particular circuit breaker, the enclosure fluidly coupled to an air flow passage extending from a bottom of the circuit breakers to a top of the circuit breakers.

In another general implementation, a circuit breaker system includes a circuit breaker including an electrical input for a power circuit and positioned on a first holder in a housing of the circuit breaker system; a cooling device positioned on a second holder adjacent to the first holder in the housing, the cooling device configured to dissipate heat generated by the circuit breaker; and a control system coupled to the circuit breaker and the cooling device, the control system configured to determine a temperature condition of the circuit breaker and control the cooling device based at least in part on the determined temperature condition.

A first aspect combinable with the general implementation further includes a current sensor configured to measure a current draw of the circuit breaker, wherein the control system is configured to determine the temperature condition based on the measured current draw.

A second aspect combinable with any of the previous aspects further includes a temperature sensor configured to measure a temperature of the circuit breaker, wherein the control system is configured to determine the temperature condition based on the measured temperature.

In a third aspect combinable with any of the previous aspects, the control system is configured to increase power of the cooling device in response to determining that the temperature condition of the circuit breaker approaches or is beyond a predetermined threshold.

In a fourth aspect combinable with any of the previous aspects, the housing includes a base and an inner volume defined by sides and a cover, and the first and second holders are assembled on the base, and the cover at least partially encloses the circuit breaker and the cooling device within the inner volume.

Various implementations of cooling electrical equipment may include one or more of the following features. For example, cooling devices can be placed in the electrical equipment for actively cooling circuit breakers, and the electrical equipment can satisfy regulatory requirements (e.g., UL and/or CE regulations). As another example, the cooling devices, like the circuit breakers, can be placed in any desired location among the circuit breakers in the electrical equipment, which enables effective cooling, convenient operation and maintenance, and compact and cost-efficient configuration. Also, active cooling with the cooling devices can maintain the electrical equipment in operating temperatures, which increases a life span of the electrical equipment. Further, the cooling devices may enable the electrical equipment to have large tolerance for faults due to overload, short-circuit, and/or power outage for a specific period of time. As a further example, the electrical equipment with active cooling may enable the use of solid state circuit breakers for fast, easy, and efficient operation with repeatable accuracy and high reliability.

These general and specific aspects may be implemented using a device, system, method, or any combinations of devices, systems, or methods. The details of one or more implementations are set forth in the accompanying drawings and the description below. Other features, objects, and advantages will be apparent from the description and drawings, and from the claims.

BRIEF DESCRIPTION OF THE DRAWINGS

FIGS. 2A-2C illustrate various configurations of example electrical equipment including cooling devices according to the present disclosure.

DETAILED DESCRIPTION

The present disclosure describes electrical equipment with cooling devices. In some implementations, the electrical equipment includes a number of circuit breakers positioned on respective holding assemblies within a housing. A cooling device is positioned on a particular holding assembly adjacent to the circuit breakers and within the housing. The particular holding assembly may be similar to a holding assembly for a circuit breaker, and a size of the cooling device may be similar to a size of a circuit breaker. The cooling device dissipates heat that is generated by the circuit breakers and may maintain the circuit breakers within an operational temperature range. In some aspects, the electrical equipment (or other device or control system) may determine whether one or more circuit breakers generate excessive heat, and/or determine that a temperature of one or more circuit breakers exceeds, or are about to exceed, a predetermined threshold. The electrical equipment (or other device or control system) may cool the one or more circuit breakers with the cooling device to remove the excessive heat to make the temperature of the circuit breakers within a particular temperature range.

Figure 1A:
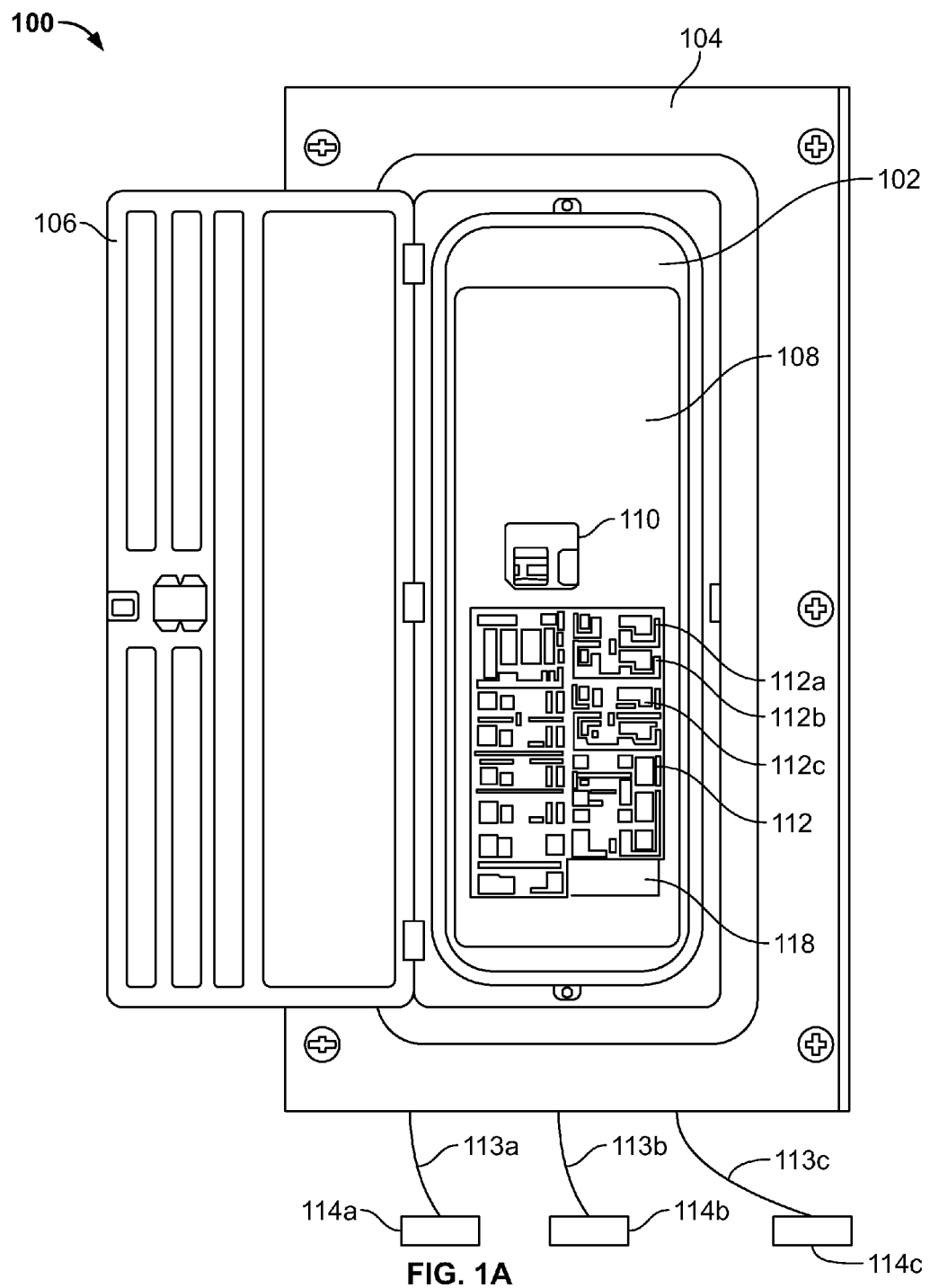
FIGS. 1A-1B illustrate various views of example electrical equipment according to the present disclosure.
Figure 1B:
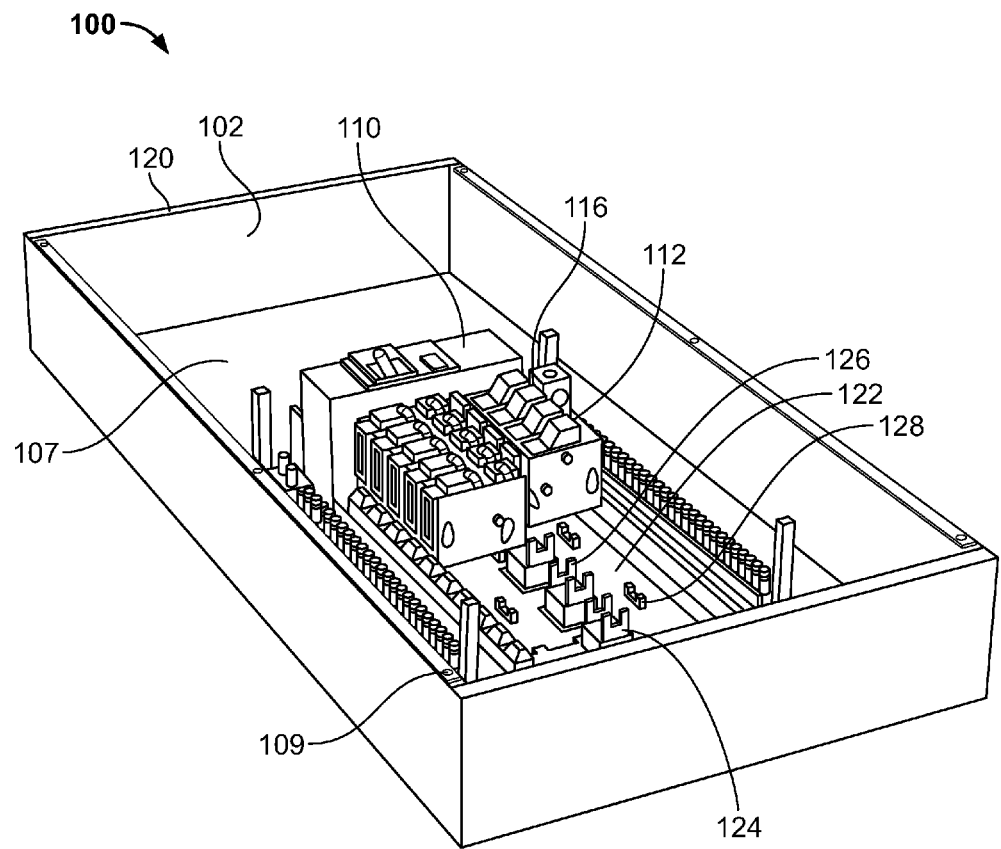

FIGS. 1A-1B illustrate various views of example electrical equipment 100. In some implementations, the electrical equipment 100 includes a housing 102 mountable to a supporter 104. The supporter 104 may be flat and mounted to a wall, e.g., through mechanical fasteners. The housing 102 can be enclosed by a gate 106, and the gate 106 can be opened for accessing and operating a number of electrical devices 112 positioned in the housing 102.

The electrical devices 112 can be low-voltage breaking devices, e.g., with nominal voltages between 0 and 1000V for alternating current (AC) or between 0 and 1500 V for direct current (DC). The low-voltage breaking devices may include automatic circuit breakers, disconnects, contactors, or switching devices, hereinafter collectively referred to as circuit breakers. The electrical equipment 100 including the circuit breakers 112 can be used for current control and fault limiting on power circuits connected to the circuit breakers 112. In some aspects, the electrical devices 112 can include computing devices (e.g., servers, processors, memory, networking switches and otherwise), sensing devices, communication devices, or other types of electrical devices.

The housing 102 includes an inner volume 107 defined by a cover 108 and side walls 120. The side walls 120 may include holes 109 for mechanical fasteners, e.g., screws, to fix the cover 108 on the side walls 120. The cover 108, with or without the gate 106, can cover the circuit breakers 112 within the inner volume 107 and protect users away from the circuit breakers 112 during use.

In some implementations, the housing 102 includes a base 122. The base 122 is within the inner volume 107 and can be mounted on a bottom of the housing 102. The base 122 includes a number of holding assemblies 124 for holding respective circuit breakers 112 in position. The base 122 may be a distribution switchboard with electrical power distribution lines, e.g., bus bars and/or cables. The holding assemblies 124 can be conductively connected to the electrical power distribution lines.

A circuit breaker 112 can be installed on a holding assembly 124 in any suitable way. In some examples, electrical terminals of the circuit breaker 112 are directly and stably connected to conductors of the holding assembly 124 via clamps or screws. In some examples, the circuit breaker 112 is mechanically coupled to the holding assembly 124 through an adapter device, e.g., plug-in electrical terminals. The plug-in coupling may be a plug-socket type. In some examples, accessory elements are added for facilitating plugging and removing the circuit breaker 112.

Each holding assembly 124 can be sized for positioning a respective circuit breaker 112. In a particular example, each circuit breaker 112 has a substantially identical shape or size, e.g., in width, length, and/or height. Each holding assembly 124 has a substantially identical shape or size that is sized to accommodate the circuit breakers 112. A circuit breaker 112 can be positioned on any holding assembly 124 of the base 122.

The holding assemblies 124 can be longitudinally arranged on the base 122. In some examples, the holding assemblies 124 are arranged in one or more rows on the base 122. Two adjacent holding assemblies 124 can be separated with a distance. The distance is configured so that when two circuit breakers 112 are positioned on the two adjacent holding assemblies 124, respectively, there is still space left for air flowing across the circuit breakers 112.

Each holding assembly 124 can be any desired shape, structure, or configuration. In some implementations, the holding assembly 124 includes a front holder 126 and a back holder 128. For example, a first circuit breaker 112 can be held by a first front holder 126 and a first back holder 128, and a second circuit breaker 112 can be held by a second front holder 126 and a second back holder 128. The first and second front holders 126 and the first and second back holders 128 can be cleats. Each circuit breaker 112 can include corresponding front and/or back slots that fit into the cleats. In a particular example, the first and second front holders 126 are combined together and mounted on a middle of the base 122, and the first and second electrical apparatuses are positioned opposite on the base 122.

In some implementations, the electrical equipment 100 includes a circuit breaker system that includes a main circuit breaker 110 and a number of branch circuit breakers 112, e.g., circuit breakers 112a, 112b, and 112c. The main circuit breaker 110 may have a size larger than each branch circuit breaker 112. A holding assembly 124 can be sized for installing the main circuit breaker 110, e.g., on a top or bottom of the base 122.

The circuit breakers 112 and 110 may be low voltage circuit breakers, e.g., residential circuit breakers. For example, the circuit breakers 112 and 110 can have a voltage rating, e.g., 60, 125, 125/250, 160, 250, 500, or 600 VDC, or 120, 127, 120/240, 240, 277, 347, 480Y/277, 480, 600Y/347, or 600 VAC. In a particular example, circuit breakers for use in communications equipment may carry ratings of 30, 65, or 80 VDC. The circuit breakers 112 or 110 may have current ratings, e.g., 225 A or less. The circuit breakers 112 and 110 can be single-pole breakers, two-pole breakers, three-pole breakers, four-pole breakers, or any other types of breakers.

The main circuit breaker 110 can be connected to a power supply source and receive power from the power supply source. The electrical equipment 100 may include one or more bus bars that carry the power from the main circuit breaker 110 to individual branch circuit breakers 112. Each branch circuit breaker 112 can be connected to a power or electrical circuit, e.g., a lighting system, a computer system, or a washer system, through wires. The wires carry the power from the branch circuit breakers 112 to respective power circuits. For example, power circuits 114a, 114b, and 114c are connected to individual circuit breakers 112a, 112b, and 112c through wires 113a, 113b, and 113c, respectively.

In some implementations, the one or more bus bars are assembled on the base 122. The holding assemblies 124, e.g., the front holders 126 and/or the back holders 128, can be connected to the one or more bus bars. The holding assemblies 124 may include conductors, e.g., copper, for connecting to conductors assembled on the circuit breakers 110 and 112 when the circuit breakers 110 and 112 are installed on the holding assemblies 124. The circuit breakers 110 and 112 may include screws for attaching wires from the power supply source or the power circuits.

The main circuit breaker 110 can act as a current control and fault limiting device to the branch circuit breakers, e.g., the circuit breakers 112a, 112b, 112c, and power circuits, e.g., the power circuits 114a, 114b, and 114c, connected to the electrical equipment 100. With the main circuit breaker 110 being off, there can be no power fed to the bus bars that feed the branch circuit breakers 112 and thus the power circuits. The main circuit breaker 110 can be configured to trip if a current flowing over the main circuit breaker 110 exceeds a predetermined value. The predetermined value may be labeled on the main circuit breaker 110. The main circuit breaker 110 may trip due to a fault current state, e.g., overload, short circuit, or power surge.

Each branch circuit breaker 112 can act as a current control and fault limiting device to the corresponding power circuit that is connected to the branch circuit breaker 112. The branch circuit breaker 112 can be configured to trip if a current flowing over the branch circuit breaker 112 exceeds a predetermined value. The predetermined value may be labeled on the branch circuit breaker 112. The branch circuit breaker 112 may trip due to a fault current state, e.g., power surge, overcurrent, or short circuit.

Each circuit breaker 112 or 110 may include a switch 116 for energizing and de-energizing a power circuit connected to the circuit breaker and can be reset after the fault current state has been cleared. In some examples, the switch 116 includes an operating handle that can be switched among three positions: "ON," "OFF," and "TRIPPED." When the operating handle is in the "ON" position, contacts between the circuit breaker and the power circuit are closed, and the circuit breaker and the power circuit are connected. When the operating handle is in the "OFF" position, the contacts are open and the circuit breaker and the power circuit are disconnected. When the operating handle is in the "TRIPPED" position, the contacts are open and the circuit breaker trips. The circuit breaker can be reset after a trip by moving the operating handle to the "OFF" position and then to the "ON" position. In some examples, the circuit breaker 112 or 110 can be reset by the switch 116 after automatic opening from the fault current state.

Figure 2C:
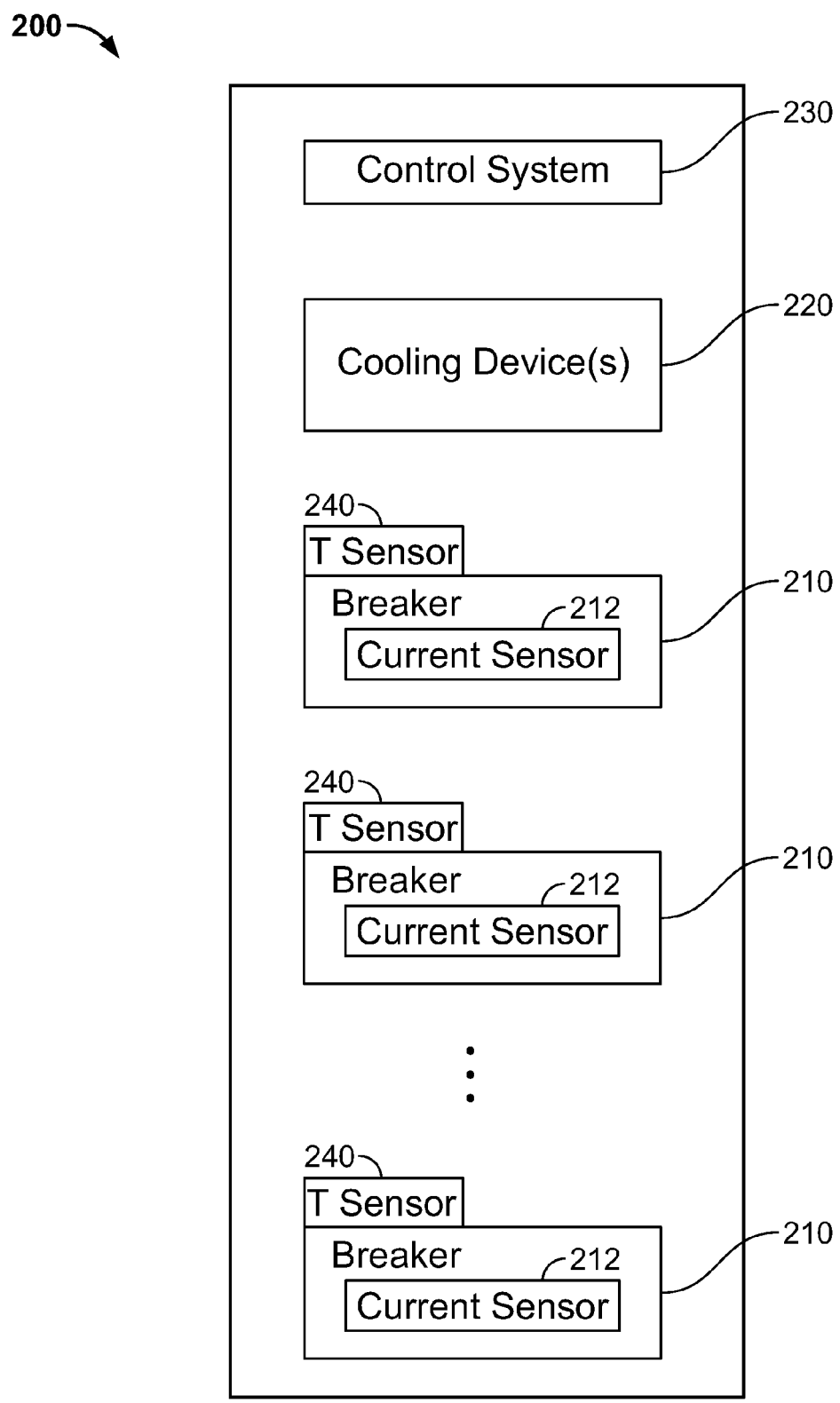

In some implementations, each circuit breaker 112 or 110 includes a current sensor, as discussed with further details in FIG. 2C. The current sensor can be configured to measure a current of a circuit connected to the circuit breaker 112 or 110. In some examples, the measured current can be used to determine a fault current state by comparing the measured current with a predetermined current threshold, e.g., a maximum current. In some examples, the current sensor can calculate a first temporal derivative based on the measured current for determining or predicting a fault current state.

In some examples, the circuit breaker 112 or 110 is a solid state circuit breaker. The circuit breaker 112 or 110 may include a current sensor, a solid-state interrupter, and a controller. The current sensor may monitor a current of a circuit and determines or predicts a fault current state. The solid-state interrupter can be configured to open the circuit within a specified response time upon detection of the fault current state. The controller is connected to the solid-sate interrupter and can be configured to detect the fault current state in the circuit and perform actions to coordinate the solid-state interrupter. The circuit breaker 112 or 110 may be remotely controlled and operated.

In some examples, the circuit breaker 112 further includes a mechanical interrupter, e.g., a vacuum interrupter. In response to receiving a signal from the solid-state interrupter indicating an opening of the circuit by the solid-state interrupter, the controller can command the mechanical interrupter to open, and to command the mechanical interrupter to close the circuit prior to commanding the solid-state interrupter to close the circuit.

Referring back to FIGS. 1A and 1B, the housing 102 is covered by the cover 108. In some examples, the circuit breakers 110 and 112, are enclosed within the housing 102 by the cover 108. In some examples, the electrical apparatuses are partially enclosed within the housing 102 by the cover 108. As noted above, the circuit breaker 110 or 112 may have the switch 116 on top of the circuit breaker 110 or 112. The cover 108 may include a number of slots 118. Each slot 118 is aligned with a respective holding assembly 124 of the base 122 so that a respective circuit breaker 110 or 112 positioned on the respective holding assembly 124 can protrude through the slot 118. In some examples, a user can reset a particular circuit breaker by moving the switch 116 of the particular circuit breaker without opening the cover 108.

In some examples, the number of the slots 118 is the same as the number of the holding assemblies 124. The number of the holding assemblies 124 can be the same as the number of circuit breakers 110 and 112. In some examples, the number of the holding assemblies 124 is larger than the number of circuit breakers 110 and 112. One or more holding assemblies 124 may be left empty without any circuit breaker. When the cover 108 covers the housing 102, no circuit breaker protrudes through one or more slots corresponding to the one or more holding assemblies 124. In some examples, the one or more slots may be sealed by removable slabs. In some examples, the one or more slots are open without seal and air can flow through the open slots.

In some examples, the slots 118 of the cover 108 are sized so that when the circuit breakers 110 and 112 are positioned on the holding assemblies 124 of the base 112 and protrude through the slots 118 of the cover 108, there is no space left between the slots 118 and the circuit breakers 110 and 112 for air flowing. In some examples, the slots 118 are sized large enough so that there may be still space left for air flowing through when the cover 108 covers the housing 102. In some examples, the housing 102 includes one or more ventilated openings, e.g., through the cover 108 and/or the side walls 120. The ventilated openings can be sized for air flow.

During operation, the circuit breakers 110 and 112 may generate excessive heat. For example, solid state circuit breakers can end up generating 5 to 10 W continuous heat per breaker. In some examples, the excessive heat is accumulated heat, which may be due to long time use and without effective dissipation. In some examples, the excessive heat is due to excessive current or overcurrent. The overcurrent may result from an overload, short circuit, or power surge in a particular period of time.

The excessive heat may increase temperatures of the circuit breakers 110 and 112 and/or the electrical equipment 100, which may negatively influence the operation of the circuit breakers 110 and 112 and potentially damage delicate parts of the circuit breakers 110 and 112, e.g., electrical terminals of the circuit breakers 110 and 112. A maximum operating temperature for the circuit breakers may be labeled on the circuit breakers or included in instructions for the circuit breakers. The excessive heat can be removed to maintain the circuit breakers 110 and 112 and/or the electrical equipment 100 within predetermined operation temperature ranges.

FIG. 2A depicts an example electrical equipment 200 including cooling devices. The electrical equipment 200 can be the electrical equipment 100. The electrical equipment 200 includes a housing 202. The housing 202 includes an inner volume 203 defined by a cover 204 and side walls 206. The housing 202 and the cover 204 can be the housing 102 and the cover 108 of FIGS. 1A-1B, respectively. A number of circuit breakers 210, e.g., the circuit breakers 110 and 112 of FIGS. 1A-1B, are positioned within the inner volume 203 on respective holding assemblies, e.g., the holding assemblies 124 of FIG. 1B. The circuit breakers 210 may include parts, e.g., the switch 116 of FIGS. 1A and 1B, that protrude through slots 208 in the cover 204, e.g., the slots 118 of FIGS. 1A and 1B.

In some implementations, the electrical equipment 200 includes one or more cooling devices 220 for cooling the circuit breakers 210 in the housing 202. The cooling devices 220 can be positioned within the inner volume 203. The cooling devices 220 may be positioned adjacent to one or more circuit breakers 210 so that the cooling devices 220 can dissipate heat generated by the one or more circuit breakers 210 and/or the number of circuit breakers 210 within the inner volume 203.

The electrical equipment 200 can include any desired number of cooling devices 220 in any desired location. In some examples, the electrical equipment 200 includes a cooling device 220 on a bottom of the circuit breakers 220. In some examples, as illustrated in FIG. 2A, the electrical equipment 200 includes first and second cooling devices 220. The first cooling device is positioned adjacent to a bottom of the circuit breakers 210, and the second cooling device is positioned adjacent to a top of the circuit breakers 210. The first and second cooling devices 220 may circulate air from the bottom to the top across the circuit breakers 210. In some examples, as illustrated in FIG. 2B, the electrical equipment 200 includes a third cooling device 220 in a middle of the circuit breakers 210. The third cooling device 220 may circulate air from the middle to the top of the circuit breakers 210. Although three cooling devices 220 are mentioned here, there may, of course, be additional devices 220 as appropriate according to the present disclosure.

In some implementations, the cooling devices 220 are mounted to the cover 204 and/or adjacent circuit breakers 210. In some implementations, the number of the holding assemblies is larger than the number of circuit breakers 210. The cooling devices 220 can be positioned on one or more empty holding assemblies, e.g., without the circuit breakers 210. The cooling devices 220 may include structures same as the circuit breakers 210 that fit with the holding assemblies. For example, the holding assemblies may include cleats and the circuit breakers include slots that fit into the cleats. The cooling devices 220 can also have similar slots that fit into the cleats of the holding assemblies. In some examples, the cooling devices 220 are conductively coupled to the holding assemblies and receive power from an electrical power distribution line through the holding assemblies. In some examples, the cooling devices 220 are positioned on the holding assemblies without conductive connections. The cooling devices 220 may receive power from a power source through wires or cables.

The cooling devices 220 can have sizes that are the same as, or similar to, the circuit breakers 210, e.g., in width, length, and/or height. In a particular example, the cooling devices 220 are the same as the circuit breakers 210 in shape. The cooling devices 220 may have same exterior design as the circuit breakers 210. In some examples, the cooling devices 220 may have a different color from the circuit breakers 210 for discrimination.

When the cooling devices 220 are positioned on one or more holding assemblies, the cooling devices 220 may have parts protruding through slots of the cover 204 that correspond to the holding assemblies. In some examples, the cooling devices 220 have no parts protruding through the slots 208 and the cooling devices 220 are entirely under the cover 204. The slots 208 above the cooling devices 220 may be open and air can flow through the slots 208 above the cooling devices 220.

FIG. 2C illustrates the electrical equipment 200 with a control system 230 for the circuit breakers 210 and the cooling device 220. As noted above, each circuit breaker 210 may have a current sensor 212 configured to measure a current of a circuit connected to the circuit breaker 210. The measured current can be used to determine a fault current state, e.g., by comparing the measured current with a predetermined current threshold. In some examples, the current sensor 212 calculates a first temporal derivative based on the measured current for determining or predicting a fault current state. In some implementations, the electrical equipment 200 includes a current sensor 212 for each circuit breaker 210. The current sensor 212 may be coupled to the circuit breaker 210.

The control system 230 can collect, e.g., in real time, current values and/or first temporal derivative values for each circuit breaker 210, e.g., from the current sensor 212 for the circuit breaker 210. The control system 230 can monitor or determine a temperature condition or a temperature condition based on the current values and/or first temporal derivative values for each circuit breaker 210. In some examples, the control system 230 determines the temperature condition based on a history of the current values for the circuit breaker 210, e.g., in the past one or two hours. The control system 230 may determine an instant temperature of the circuit breaker 210 and/or predict a new temperature that the circuit breaker 210 is about to have in a period of time, e.g., in 1 minute, 5 minutes, or 10 minutes.

In some examples, the control system 230 determines the temperature condition based on peak values of current waveforms. In some examples, the control system 230 samples current waveforms and converts each current value into a digital representation. The control system 230 can use the sampled values to calculate an RMS (root mean square) value of the current waveforms and determine the temperature condition based on RMS values for the circuit breaker 210.

In some implementations, the electrical equipment 200 includes a number of temperature sensors 240 for the number of circuit breakers 210. Each temperature sensor 240 is attached to a respective circuit breaker 210. The temperature sensor 240 can monitor and measure a temperature on a surface of the circuit breaker 210. The temperature sensor 240 may be positioned adjacent to delicate parts of the circuit breaker 210, e.g., electrical terminals. The temperature sensor 240 may include a memory for storing the temperature values for the circuit breaker 210. In some implementations, each circuit breaker 210 includes a respective temperature sensor 240.

The control system 230 may collect temperature values, e.g., in real time, from the temperature sensor 240 for the circuit breaker 210. In some examples, the control system 230 determines or predicts a temperature for the circuit breaker 210 based on the measured temperature values from the temperature sensor 240 and the measured current values from the current sensor 212 of the circuit breaker 210. In some examples, the control system 230 determines or predicts a temperature for the electrical instrument 200 based on measured temperature values from temperature sensors 240 and measured current values from current sensors 212 for the circuit breakers 210.

After determining an instant temperature or predicting a temperature for the circuit breaker 210, the control system 230 determines whether the instant temperature or the predicted temperature is beyond a predetermined threshold, e.g., a maximum operating temperature for the circuit breaker 210. If the control system 230 determines the instant temperature or the predicted temperature is beyond the predetermined threshold, the control system 230 may control or send commands to the cooling devices 220. The control system may command the cooling devices 220 to turn on the cooling devices and/or one or more extra cooling devices, to increase dissipation power of the cooling devices 220, e.g., by increasing an input voltage for the cooling devices 220, or both.

After determining that the instant temperature of the circuit breaker 210 is within a predetermined range, e.g., an operation temperature range, the control system 230 may command the cooling devices 220 to return to normal operation conditions, e.g., keeping a suitable number of cooling devices 220 on and/or working under normal power.

Each cooling device 220 can be any suitable cooling structure using any suitable mechanism. In some implementations, the cooling device 220 includes a thermoelectric component (TEC), e.g., a Peltier cooler. The TEC can be positioned on a particular holding assembly within the housing 202. The TEC includes a cold side and a hot side. The cold side can be positioned close to or attached to a circuit breaker 210. In some examples, a cold side heat sink is inserted between the TEC and the circuit breaker 210. The cold side heat sink can be attached to the TEC and the circuit breaker 210 using a thermally conductive material. The hot side of the TEC can be attached to a hot side heat sink. A fan, can be mounted, e.g., on the cover 204, with a distance from the hot side heat sink. The fan may pull air into fins of the hot side heat sink. The heated air can be pulled by the fan away from the hot side heat sink and/or out of the housing 202. The cooling device 220 may increase dissipation power by increasing a speed of the fan, or increasing a supply voltage of the TEC, or both.

In some implementations, the cooling device 220 includes a liquid based heat exchanger, e.g., a cooling pipe system and/or a condenser. The heat exchanger can circulate cold liquid over the circuit breakers 210, extending from a bottom of the circuit breakers 210 to a top of the circuit breakers 210. The cooling device 220 can increase dissipation power by increasing a flow speed of the cold liquid and/or decreasing a temperature of the cold liquid in the heat exchanger.

In some implementations, the cooling device 220 includes one or more dissipation plates. The dissipation plates can be positioned on empty holding assemblies adjacent to one or more circuit breakers 210 for cooling the one or more circuit breakers 210. When determining that temperature conditions of the one or more circuit breakers are beyond the predetermined threshold, the control system 230 can turn on the one or more dissipation plates adjacent to the one or more circuit breakers 210.

In some implementations, the cooling device 220 includes one or more fans. The fans may include one or more of an axial-flow fan, a centrifugal fan, or a cross flow fan. The fans may include one or more of a centrifugal blower or a positive-displacement blower. In some examples, the fans use centrifugal force to propel air forward or backward. A fan may include a wheel with blades on the circumference and a casing to direct flow of air into the center of the wheel and out toward the edge. The blades may be are curved in a direction of rotation or flat and slant away from a direction of flow. The fans may be forward-curved air blowers, backward-inclined air blowers, backward-curved air blowers, radial air blowers, or airfoil air blowers.

Figure 3A:
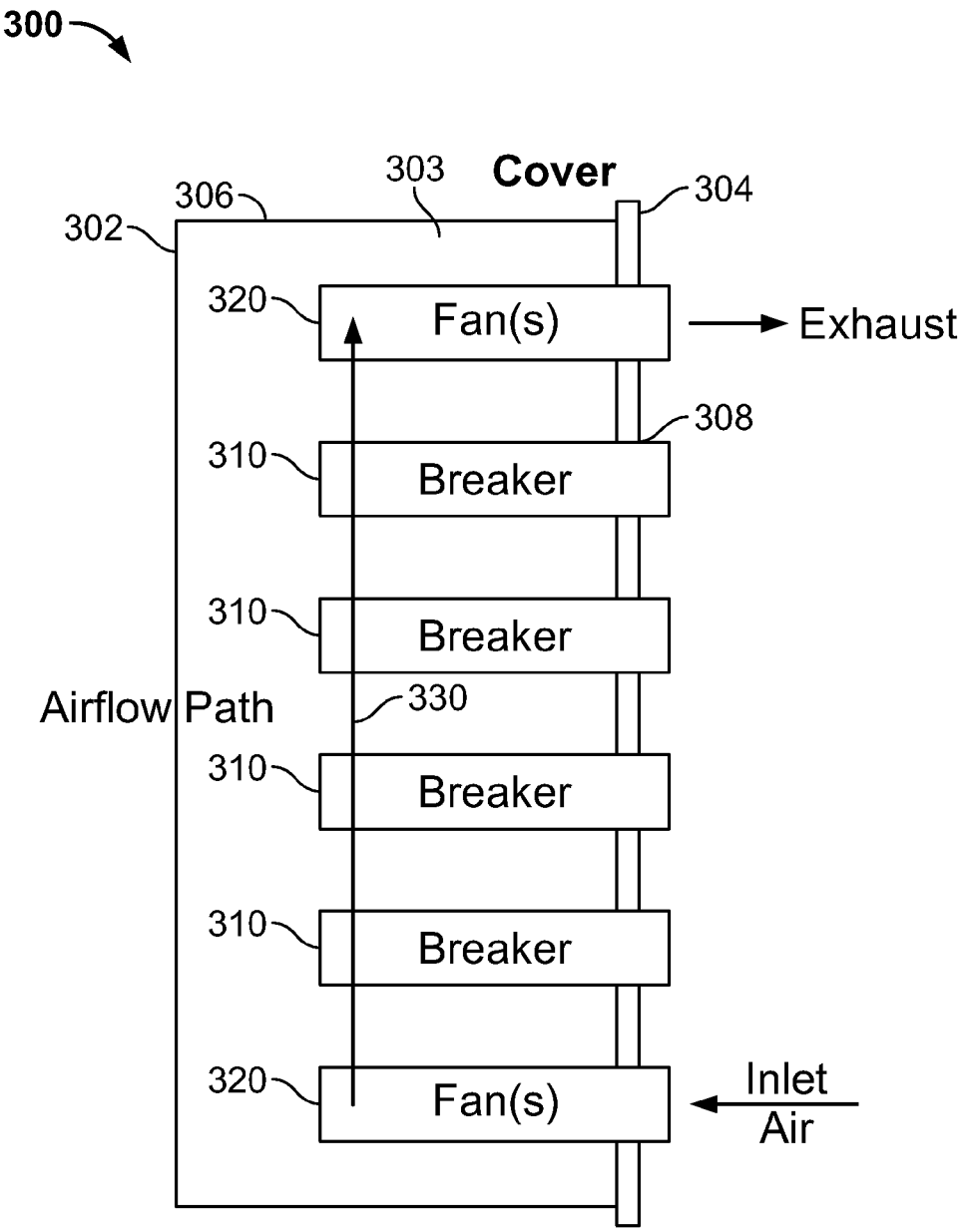
FIGS. 3A-3B illustrate various configurations for example electrical equipment including fans according to the present disclosure.
Figure 3B:
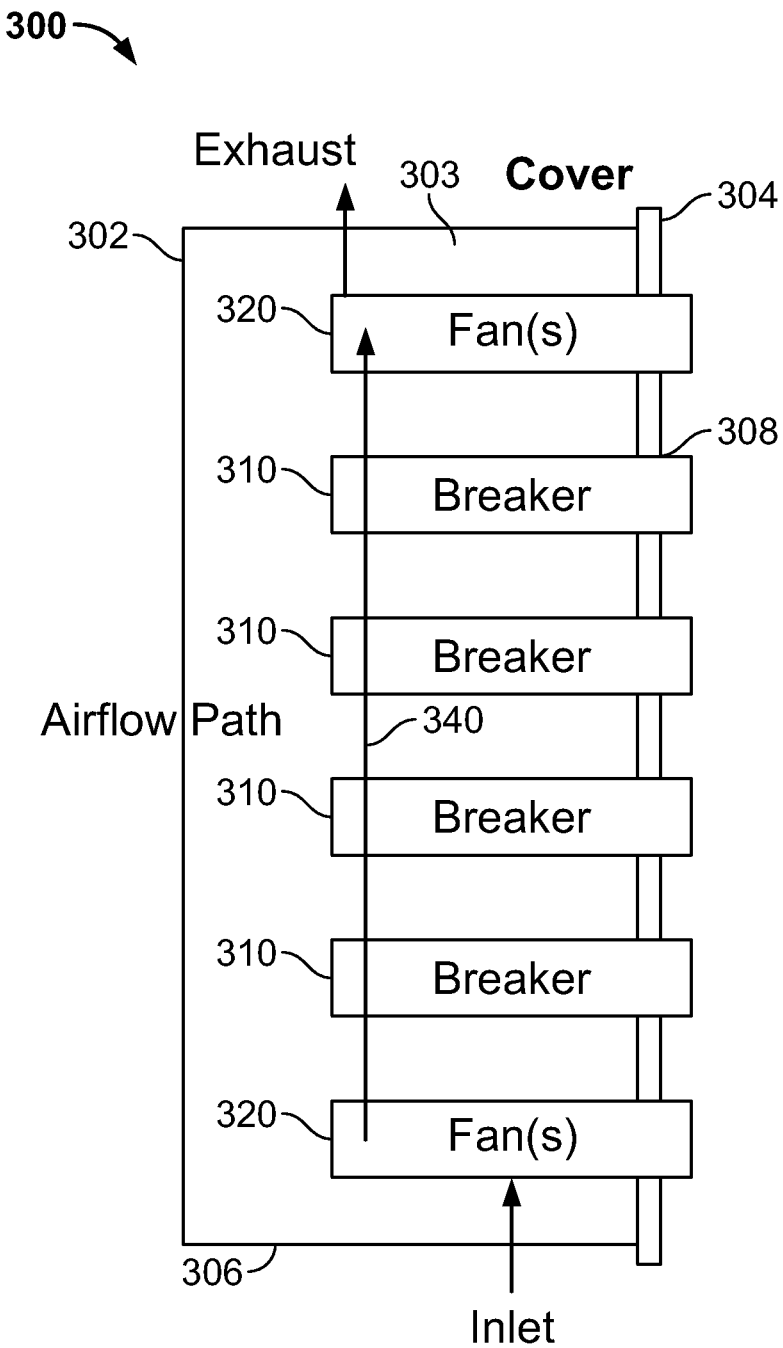

FIGS. 3A and 3B illustrate example configurations for electrical equipment 300 including fans. The electrical equipment 300 can be the electrical equipment 100 of FIGS. 1A-1B or the electrical equipment 200 of FIGS. 2A-2C. The electrical equipment 300 includes a housing 302, e.g., the housing 102 of FIGS. 1A-1B or the housing 202 of FIGS. 2A-2B. The housing 302 includes an inner volume 303 defined by a cover 304 and sides 306. The cover 304 can be the cover 108 of FIGS. 1A-1B or the cover 204 of FIGS. 2A-2B. A number of circuit breakers 310, e.g., the circuit breakers 110 and 112 of FIGS. 1A-1B or the circuit breakers 212 of FIGS. 2A-2C, are positioned within the inner volume 303 on respective holding assemblies, e.g., the holding assemblies 124 of FIG. 1B. The circuit breakers 310 may include parts, e.g., the switch 116 of FIGS. 1A and 1B, that protrude through slots 308 in the cover 304, e.g., the slots 118 of FIGS. 1A and 1B or the slots 208 of FIGS. 2A and 2B.

The electrical equipment 300 may include one or more cooling devices 320, e.g., the cooling devices 220 of FIGS. 2A-2C. The one or more cooling devices 320 are positioned adjacent to one or more circuit breakers 310. In a particular example, the one or more cooling devices 320 are positioned on one or more empty holding assemblies adjacent to the one or more circuit breakers 310. The empty holding assemblies may be substantially same as the holding assemblies for the circuit breakers 310. The one or more cooling devices 320 may be substantially same as the circuit breakers in size, e.g., in width, length, and/or height. The one or more cooling devices 320 are configured to dissipate heat generated by the circuit breakers 310 in the inner volume 303.

In some implementations, the electrical equipment 300 includes a cooling device 320. The cooling device 320 can be positioned adjacent to a bottom of the circuit breakers 310. The cooling device 320 can include one or more fans. The fans can circulate ambient air from outside the housing 302 into the inner volume 303, e.g., through a slot in the cover 304 and/or an opening in the sides 306. The fans are positioned to circulate air in the housing across the circuit breakers, e.g., from the bottom to a top of the circuit breakers.

In some implementations, the electrical equipment 300 includes first and second cooling devices 320. The number of circuit breakers 310 are arranged in one or more rows on a base of the housing 302, e.g., the base 122 of FIG. 1B. The first cooling device 320 is positioned adjacent to a bottom of the circuit breakers 310, and the second cooling device 320 is positioned adjacent to a top of the circuit breakers 310.

The first cooling device 320 may include one or more first fans. The second cooling device 320 may include one or more second fans. The first and second fans can circulate air in the housing 302 across the circuit breakers 310 from the bottom to the top. In some examples, adjacent circuit breakers 310 have space for air flowing over the circuit breakers. In some examples, each circuit breaker includes an enclosure with ventilation that allows air flow through the circuit breaker to cool the circuit breaker.

FIG. 3A depicts a configuration for the electrical equipment 300 using air external to the housing 302. The first cooling device 320 can circulate ambient air from outside of the housing 302 into the inner volume 303 through an inlet in the cover 304. The inlet may include a first open slot 308 aligned with a first holding assembly for the first cooling device 320. The first fans are configured to circulate the air towards a longitudinal direction along an airflow passage 330, e.g., from the bottom to the top of the circuit breakers 310. The circulated air may go into enclosures of the circuit breakers 310 through ventilation in the enclosures, and thus remove heat generated by the circuit breakers 310. The second fans receive the heated air from the circuit breakers 310 and circulate the heated air out of the inner volume 303 through an outlet of the cover 304. The outlet may include a second open slot 308 aligned with a second holding assembly for the second cooling device 320.

FIG. 3B depicts a configuration for the electrical equipment 300 using internal air within the housing 302. The first fans 320 may circulate air from the bottom of the circuit breakers 310 towards a longitudinal direction along an airflow passage 340, e.g., across the number of circuit breakers 310 from the bottom towards the top. The second fans 320 may receive the heated air from the circuit breakers 310 and circulate the heated air away from the circuit breakers 310. The first and second slots 308 of the cover 304 aligned with the holding assemblies for the first and second cooling devices 320 may be sealed, e.g., with removable slabs.

In some implementations, one or more side walls 306 of the housing 302 include openings for air flowing inside the housing 302 and/or outside the housing 302. The first fans 320 may circulate external air from an inlet on a bottom side wall 306 into the inner volume 303. The first fans 320 can further circulate the external air flowing along the air flow passage 340, e.g., across the number of circuit breakers 310 from the bottom side to the top side. The second fans 320 receives the heated air and may exhaust the heated air from an outlet on a top side wall 306 towards outside of the inner volume 303.

Figure 4:
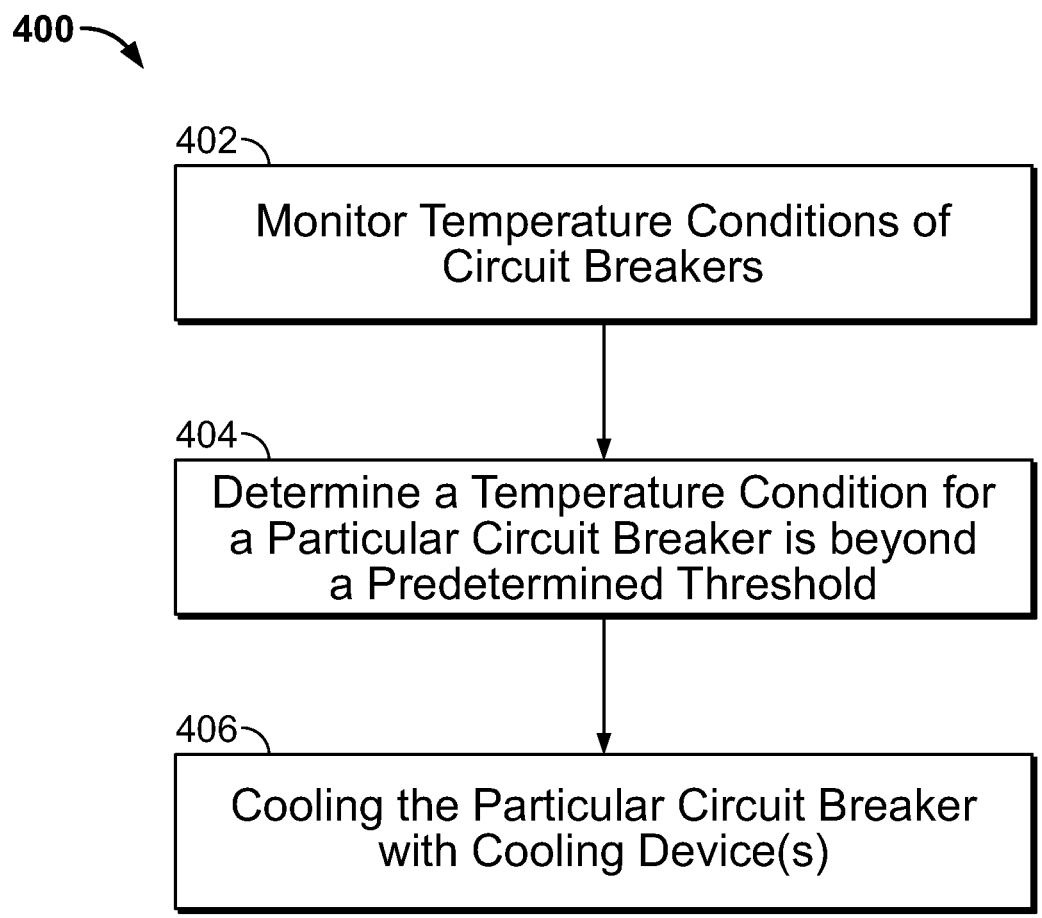
FIG. 4 depicts an example process that can be executed by electrical equipment including cooling devices according to the present disclosure.

FIG. 4 depicts an example process 400 that can be executed by electrical equipment including one or more cooling devices according to the present disclosure. The electrical equipment can be the electrical equipment 100 of FIGS. 1A-1B, 200 of FIGS. 2A-2C, or 300 of FIGS. 3A-3B. The one or more cooling devices can be the cooling devices 220 of FIGS. 2A-2B or the cooling devices 320 including fans of FIGS. 3A-3B. The electrical equipment includes a number of circuit breakers, e.g., the circuit breakers 110 and 112 of FIGS. 1A-1B, the circuit breakers 210 of FIGS. 2A-2C, or the circuit breakers 310 of FIGS. 3A-3B. The circuit breakers and the one or more cooling devices can be positioned in respective holding assemblies, e.g., the holding assemblies 124 of FIGS. 1A-1B, in a housing, e.g., the housing 102 of FIGS. 1A-1B, 202 of FIGS. 2A-2B, or 302 of FIGS. 3A-3B. The one or more cooling devices can be positioned adjacent to the circuit breakers.

The electrical equipment monitors temperature conditions of the circuit breakers (402). Each circuit breaker may include a current sensor, e.g., the current sensor 212 of FIG. 2C, for measuring a current flowing over the circuit breaker or a current draw of the circuit breaker. The electrical equipment or each circuit breaker may include a temperature sensor, e.g., the temperature sensor 240 of FIG. 2C, for the circuit breaker that measures a temperature of the circuit breaker. The electrical equipment includes a control system, e.g., the control system 230 of FIG. 2C, that can collect the measured current values and/or temperature values for each circuit breaker. The control system can calculate an instant temperature or predict a new temperature for each circuit breaker based on the measured current values and/or the temperature values and/or a history of the current values and/or the temperature values for the circuit breaker.

The electrical equipment determines that a temperature condition for a particular circuit breaker is beyond a predetermined threshold (404). The control system may determine the instant temperature for the particular circuit breaker exceeds the predetermined threshold, e.g., a maximum operating temperature for the particular circuit breaker. In some examples, the control system predicts that the particular circuit breaker is about to have a temperature higher than the maximum operating temperature in a period of time, e.g., in 1 minute, 5 minutes, or 10 minutes. The control system can predict the temperature based on the measured current values, first temporal derivative values of the measured current values, the measured temperature values, and/or a history of the current values and/or the temperature values for the particular circuit breaker.

The electrical equipment cools the particular circuit breaker with the one or more cooling devices (406). After determining the temperature condition for the particular circuit breaker is beyond the predetermined threshold, the electrical equipment may turn on the cooling devices and/or increase dissipation power of the cooling devices to remove excessive heat generated by the particular circuit breaker and decrease the temperature of the particular circuit breaker. In some examples, the control system can turn on one or more cooling devices adjacent to the particular circuit breaker, or increase power, e.g., supply voltages, of one or more cooling devices adjacent to the particular circuit breaker. In some examples, the electrical equipment includes first and second cooling devices that include fans adjacent to two ends of the circuit breakers. The control system can increase power of the cooling devices to increase a speed of circulating air. After determining that the instant temperature of the particular circuit breaker is within a predetermined range, e.g., an operation temperature range, the control system may command the cooling devices to return to normal operation conditions, e.g., keeping a suitable number of cooling devices on and/or working under normal power.

Embodiments of the subject matter and the functional operations described in this specification, e.g., the functional operations performed by one or more control systems, can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A control system or controller can also be or further include special purpose logic circuitry, e.g., an FPGA (field programmable gate array) or an ASIC (application-specific integrated circuit). The control system or controller can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable control systems or controllers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Control systems or controllers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a control system or controller are a central processing unit for performing or executing instructions and one or more memory devices for storing instructions and data. Generally, a control system or controller will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some examples be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

A number of examples have been described. Nevertheless, it will be understood that various modifications may be made. For example, the method can be used for cooling a processor, e.g., a central processing unit (CPU), of a computer by placing cooling devices in computer slots on the motherboard of the computer. Accordingly, other examples are within the scope of the following claims.

What is claimed is:

1. An electrical apparatus, comprising:
    a housing comprising a base that comprises a plurality of holding assemblies and an inner volume defined by sides and a cover;
    a plurality of circuit breakers, at least one circuit breaker configured to be coupled to a power circuit and positioned on a respective holding assembly of the base; and
    a cooling device positioned on a particular holding assembly of the base, the particular holding assembly adjacent to the circuit breakers, the cooling device configured to dissipate heat generated by the circuit breakers.

2. The electrical apparatus of claim 1, wherein at least one circuit breaker of the circuit breakers comprises a low-voltage circuit breaker that has a voltage rating between 0 and 1000 VAC or between 0 and 1500 VDC.

3. The electrical apparatus of claim 1, wherein at least one circuit breaker of the circuit breakers comprises a solid state circuit breaker.

4. The electrical apparatus of claim 1, wherein a size of the cooling device is substantially the same as a size of at least one circuit breaker.

5. The electrical apparatus of claim 1, wherein the cover comprises a plurality of slots, each slot corresponding to a respective holding assembly of the base, the slot sized for a circuit breaker positioned on the respective holding assembly to protrude through the slot.

6. The electrical apparatus of claim 5, wherein a particular slot of the plurality of slots for the particular holding assembly is open, and the cooling device is positioned to circulate ambient air into the inner volume through the particular slot.

7. The electrical apparatus of claim 1, wherein the cooling device comprises one or more fans positioned to circulate ambient air into the inner volume and across the circuit breakers.

8. The electrical apparatus of claim 1, wherein the cooling device comprises one or more fans positioned to circulate air from a bottom of the circuit breakers to a top of the circuit breakers across the circuit breakers.

9. The electrical apparatus of claim 1, further comprising a second cooling device, wherein the cooling device is positioned adjacent to a bottom of the circuit breakers, and the second cooling device is positioned adjacent to a top of the circuit breakers, the cooling device and the second cooling device configured to circulate air from the bottom to the top across the circuit breakers.

10. The electrical apparatus of claim 1, wherein at least one circuit breaker of the circuit breakers comprises an enclosure fluidly coupled to an air flow passage that extends from at or near a bottom of the housing to at or near a top of the housing.

11. The electrical apparatus of claim 1, wherein at least one circuit breaker is conductively coupled to the respective holding assembly that is conductively coupled to a power distribution line.

12. A method for cooling an electrical apparatus, comprising:
    monitoring temperature conditions of a plurality of circuit breakers in the electrical apparatus, each circuit breaker electrically coupled to a power circuit and coupled to a holding assembly of a plurality of holding assemblies in a housing of the electrical apparatus;
    determining that a temperature condition of a particular circuit breaker of the plurality of circuit breakers is beyond a predetermined threshold; and
    cooling, based on the determined temperature condition, at least one of the plurality of circuit breakers with a cooling device positioned on a particular holding assembly of the plurality of holding assemblies.

13. The method of claim 12, further comprising:
    for each circuit breaker, measuring a current that flows through the circuit breaker with a current sensor for the circuit breaker; and
    calculating, based on the measured current of the circuit breaker, at least one of an instant temperature of the circuit breaker or a predicted temperature for the circuit breaker.

14. The method of claim 13, further comprising measuring a temperature of the circuit breaker with a temperature sensor for the circuit breaker, and
calculating, based on the measured current and the measured temperature, at least one of the instant temperature or the predicted temperature for the circuit breaker.

15. The method of claim 13, further comprising determining whether at least one of the instant temperature or the predicted temperature for the circuit breaker exceeds the predetermined threshold.

16. The method of claim 12, wherein cooling the particular circuit breaker with a cooling device comprises at least one of turning on the cooling device or increasing power of the cooling device.

17. The method of claim 12, wherein cooling the at least one circuit breaker with a cooling device comprises circulating ambient air into the housing and across the at least one circuit breaker.

18. The method of claim 17, wherein circulating ambient air into the housing comprises circulating the ambient air into the housing through a slot in the housing, the slot aligned with the particular holding assembly.

19. The method of claim 12, wherein cooling the particular circuit breaker with a cooling device comprises circulating, with the cooling device, air from a bottom of the circuit breakers to a top of the circuit breakers.

20. The method of claim 12, wherein cooling the particular circuit breaker with a cooling device comprises circulating air through an enclosure of the particular circuit breaker, the enclosure fluidly coupled to an air flow passage extending from a bottom of the circuit breakers to a top of the circuit breakers.

21. A circuit breaker system, comprising:
- a circuit breaker comprising an electrical input for a power circuit and positioned on a first holder in a housing of the circuit breaker system;
- a cooling device positioned on a second holder adjacent to the first holder in the housing, the cooling device configured to dissipate heat generated by the circuit breaker; and
- a control system coupled to the circuit breaker and the cooling device, the control system configured to determine a temperature condition of the circuit breaker and control the cooling device based at least in part on the determined temperature condition.

22. The circuit breaker system of claim 21, further comprising a current sensor configured to measure a current draw of the circuit breaker, wherein the control system is configured to determine the temperature condition based on the measured current draw.

23. The circuit breaker system of claim 21, further comprising a temperature sensor configured to measure a temperature of the circuit breaker, wherein the control system is configured to determine the temperature condition based on the measured temperature.

24. The circuit breaker system of claim 21, wherein the control system is configured to increase power of the cooling device in response to determining that the temperature condition of the circuit breaker approaches or is beyond a predetermined threshold.

25. The circuit breaker system of claim 21, wherein the housing comprises a base and an inner volume defined by sides and a cover, and the first and second holders are assembled on the base, and the cover at least partially encloses the circuit breaker and the cooling device within the inner volume.

* * * * *